US008495102B2

(12) United States Patent
Fulton (10) Patent No.: US 8,495,102 B2
(45) Date of Patent: Jul. 23, 2013

(54) METHOD, SYSTEM, AND PROGRAM PRODUCT FOR ORGANIZING A DATABASE

(75) Inventor: Michael S. Fulton, Maple Ridge (CA)

(73) Assignee: International Business Machines Corporation, Armonk, NY (US)

(*) Notice: Subject to any disclaimer, the term of this patent is extended or adjusted under 35 U.S.C. 154(b) by 1182 days.

(21) Appl. No.: 11/469,609

(22) Filed: Sep. 1, 2006

(65) Prior Publication Data

US 2008/0059515 A1    Mar. 6, 2008

(51) Int. Cl.
*G06F 17/00* (2006.01)
(52) U.S. Cl.
USPC .......................................................... 707/802
(58) Field of Classification Search
USPC ..................... 707/100–104.1, 802
See application file for complete search history.

(56) References Cited

U.S. PATENT DOCUMENTS

| 6,581,056 | B1* | 6/2003 | Rao ................................... 707/5 |
| 6,668,255 | B2* | 12/2003 | Mielenhausen ............... 707/100 |
| 6,671,693 | B1* | 12/2003 | Marpe et al. ................... 707/102 |
| 6,961,731 | B2* | 11/2005 | Holbrook ....................... 707/102 |
| 7,236,988 | B2* | 6/2007 | Li et al. ....................... 707/104.1 |
| 2002/0007287 | A1 | 1/2002 | Straube et al. |
| 2002/0059325 | A1 | 5/2002 | Beizer et al. |
| 2003/0061208 | A1 | 3/2003 | Ohashi |
| 2003/0093409 | A1 | 5/2003 | Weil et al. |
| 2004/0230603 | A1* | 11/2004 | Wookey ......................... 707/102 |
| 2005/0060655 | A1 | 3/2005 | Gray et al. |
| 2005/0071187 | A1 | 3/2005 | Zubizarreta |

* cited by examiner

*Primary Examiner* — Huawen Peng
(74) *Attorney, Agent, or Firm* — Jeff Tang; Hoffman Warnick LLC (57) ABSTRACT

The invention provides a method, system, and program product for organizing a database containing a plurality of objects based on a task list of a user. In one embodiment, the invention includes accessing a database containing a plurality of objects; defining at least one of the plurality of objects as included in a task list of a user; displaying the defined object(s); determining a time at which each defined object was last accessed by the user; modifying the display based on at least one determined value; and searching the modified display.

17 Claims, 5 Drawing Sheets

METHOD, SYSTEM, AND PROGRAM PRODUCT FOR ORGANIZING A DATABASE

BACKGROUND OF THE INVENTION

1. Technical Field

The invention relates generally to databases, and more particularly, to the organization of a database containing a plurality of objects based on a task list of a user.

2. Background Art

It is common for a number of individuals to collaboratively work on a common project using a database of files or other objects related to the project. However, in most cases, each individual will not need to access every file in the database. Rather, individuals will normally be assigned various tasks requiring the use of a subset of the files or objects in the database. In complex projects, such as software development, a database may include hundreds or thousands of files or other objects and dozens of individuals each assigned tasks requiring the use of a different subset of these files or objects. In such a case, it is clearly undesirable for an individual to have to view and/or navigate his or her way through all of the files or objects in the database simply to use those within his or her subset.

Currently, a user must rely on date stamps associated with individual files or objects or simple filters, such as keyword or file extension filters, in order to narrow his or her view of the database to the files associated with his or her subset. This requires a great deal of time and effort on the part of the user and often provides less-than-satisfactory results, with relevant files excluded and/or irrelevant files included.

To this extent, a need exists for a method for organizing a database based on a task list of a user that does not suffer from the defects known in the art.

SUMMARY OF THE INVENTION

The invention provides a method, system, and program product for organizing a database containing a plurality of objects based on a task list of a user. In one embodiment, the invention includes accessing a database containing a plurality of objects; defining at least one of the plurality of objects as included in a task list of a user; displaying the defined object(s); determining a time at which each defined object was last accessed by the user; modifying the display based on at least one determined value; and searching the modified display.

A first aspect of the invention provides a method for organizing a database containing a plurality of objects based on a task list of a user, the method comprising: accessing a database containing a plurality of objects; defining at least one of the plurality of objects as included in a task list of a user; and displaying the defined object(s).

A second aspect of the invention provides a system for organizing a database containing a plurality of objects based on a task list of a user, the system comprising: a system for accessing a database containing a plurality of objects; a system for defining at least one of the plurality of objects as included in a task list of a user; and a system for displaying the defined object(s).

A third aspect of the invention provides a program product stored on a computer-readable medium, which when executed, organizes a database containing a plurality of objects based on a task list of a user, the program product comprising: a system for accessing a database containing a plurality of objects; a system for defining at least one of the plurality of objects as included in a task list of a user; and a system for displaying the defined object(s).

A fourth aspect of the invention provides a method for deploying an application for organizing a database containing a plurality of objects based on a task list of a user, comprising: providing a computer infrastructure being operable to: access a database containing a plurality of objects; define at least one of the plurality of objects as included in a task list of a user; and display the defined object(s).

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for organizing a database containing a plurality of objects based on a task list of a user.

Figure 1:
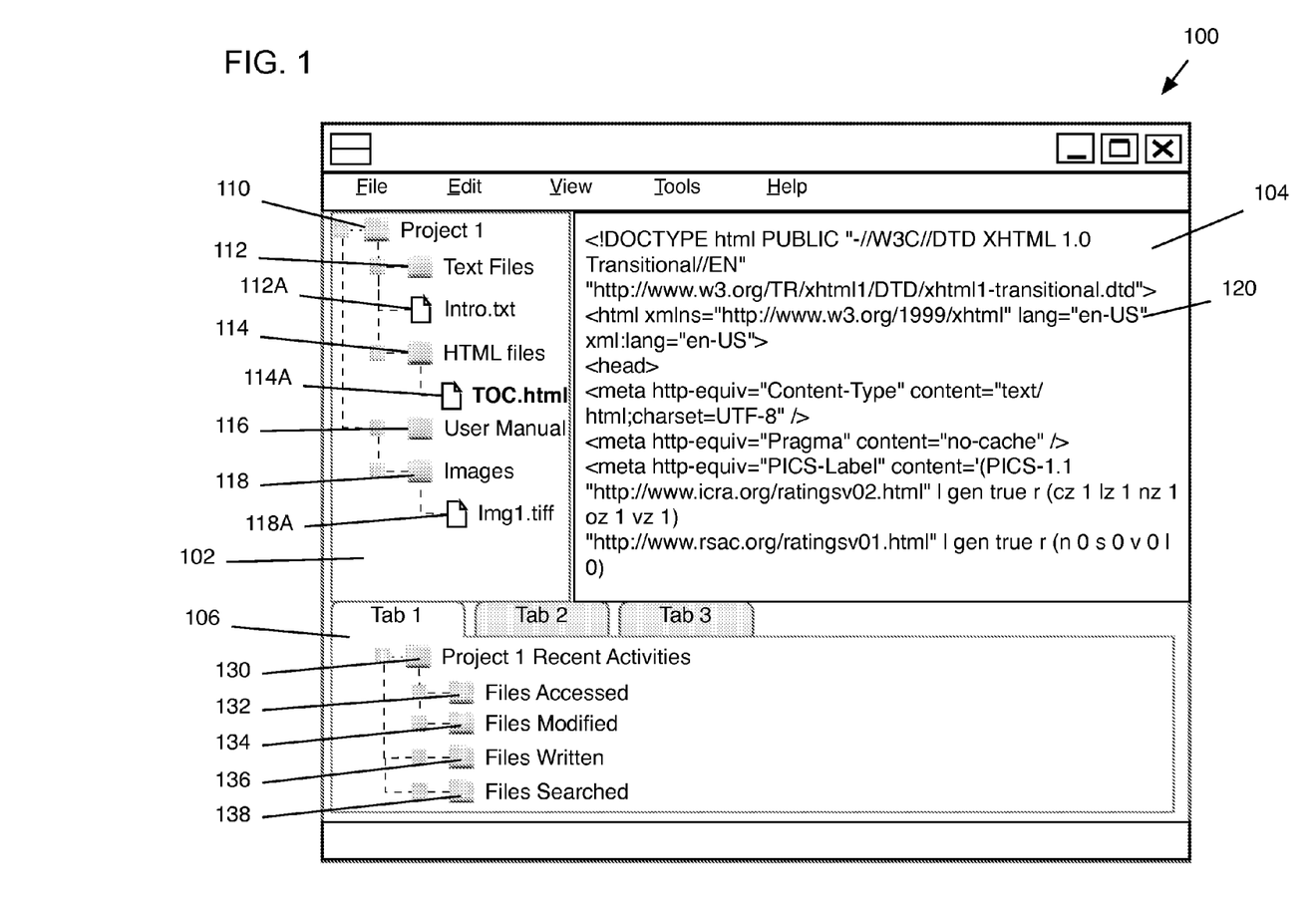
FIG. 1 shows a graphical user interface (GUI) of a computer program operating in accordance with the invention.

Referring now to the drawings, FIG. 1 shows a graphical user interface (GUI) 100 of a computer program operating in accordance with the invention. GUI 100 includes a file tree window 102, a content window 104, and an activities window 106.

File tree window 102 contains a number of categorized files 112A, 114A, 118A, which a user has defined as being included on his or her task list, the files being selected from a larger database of files associated with a project on which the user is working. As shown, files are categorized as text files 112, HTML files 114, user manual files 116, and images 118. However, it should be recognized that any number of categorizations may similarly be used. In addition, while shown as a file tree, any number of visual representations of relationships among files may also be used.

Content window 104 includes the contents of a file selected from file tree window 102. For example, as shown, content window 104 includes the HTML code 120 of the file "TOC.html" 114A.

Activities window 106 contains a number of categories 130 ... 138 representing a user's activities with respect to the files included on his or her task list. That is, rather than simply providing a user with a system-wide list of recently-accessed or recently-modified files as in known programs, activities window 106 provides the user with lists limited to files on his or her task list and/or within the broader database of files or other objects, based on the type of activity each listed file has seen. For example, files accessed 132 may include only those files accessed (e.g., opened, modified, written, or searched or, alternatively, opened but not modified, written, or searched) by the user and/or other individuals working on the project (i.e., Project 1). Similarly, files searched 138 may include files searched but not written or modified. It should be recognized that any number of other categorizations may be employed, based on the needs of an individual user or project (e.g., files moved, files transferred/emailed, files deleted, files completed, etc.), those shown in FIG. 1 being for purposes of illustration only.

Figure 2:
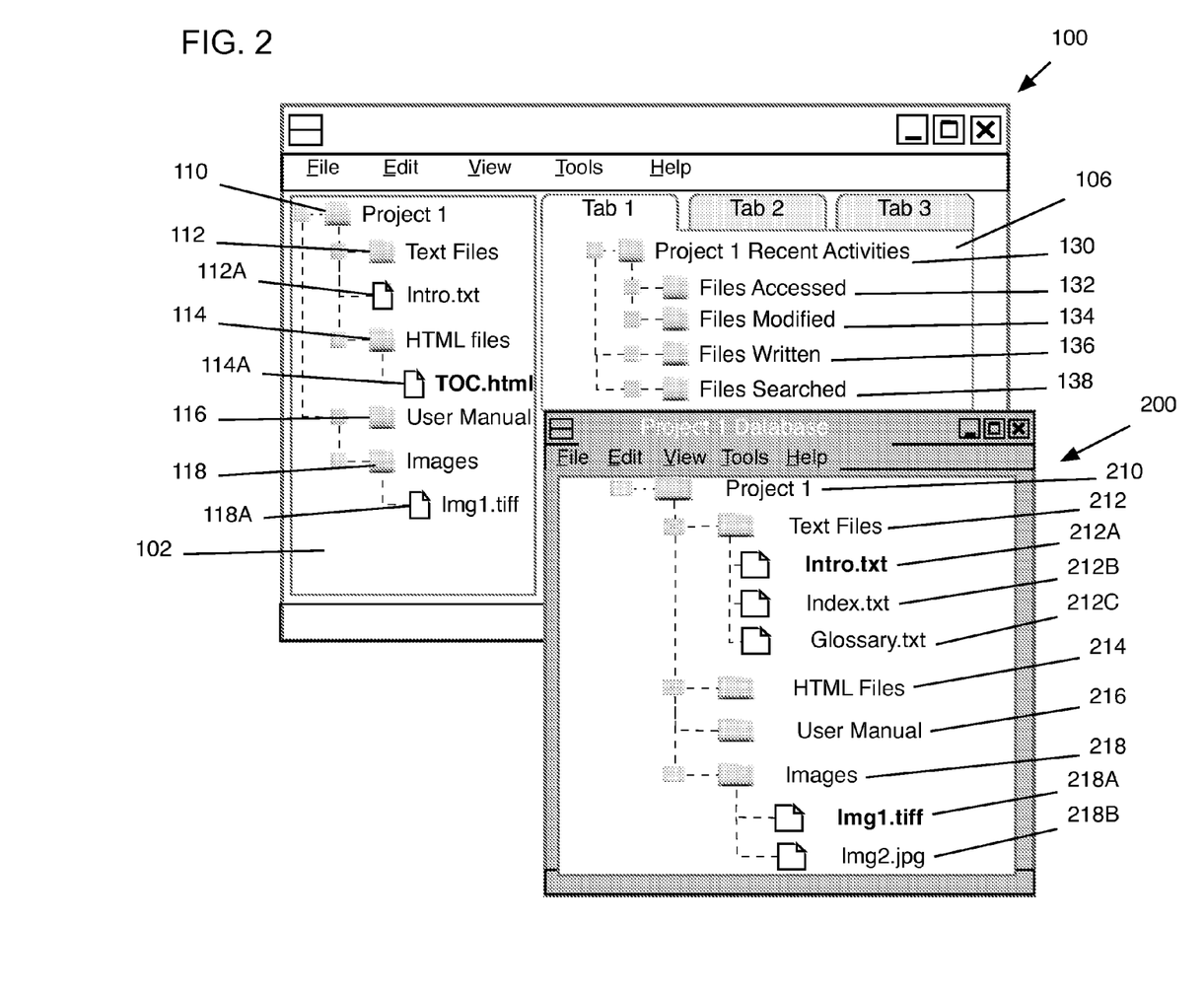
FIG. 2 shows a detailed view of a portion of the GUI of FIG. 1 in relation to a database of files.

FIG. 2 shows an alternate view of GUI 100 in association with a database GUI 200 containing files 212A-C, 218A-B among a number of categories 212, 214, 216, 218, from which a user may define his or her task list. For example, in file tree window 102 of GUI 100, the user's task list includes three files: Intro.txt 112A, TOC.html 114A, and Img1.tiff 118A. These files were selected by the user from among the files shown in database GUI 200. The user did not, however, select Index.txt 212B, Glossary.txt 212C, or Img2.jpg 218B for his or her task list. Another user working on Project 1 would likely select a different combination of files in compiling his or her task list.

In any case, the files selected by a user for his or her task list are shown within GUI 100 only as representations of (e.g., links to) the underlying files in the database, as represented in database GUI 200. That is, files are not copied or transferred from the database when a user selects files for his or her task list. Rather, links to the underlying files in the database are made in GUI 100, such that the files remain available to all users working on a project. As such, a user can access the same file in the database and view, modify, etc. the work of another user. That is, the same file may be included on the task lists of more than one user. Similarly, in the case that a user is working on more than one project (and therefore has more than one task list), the same file may be included on more than one task list of the same user.

Figure 3:
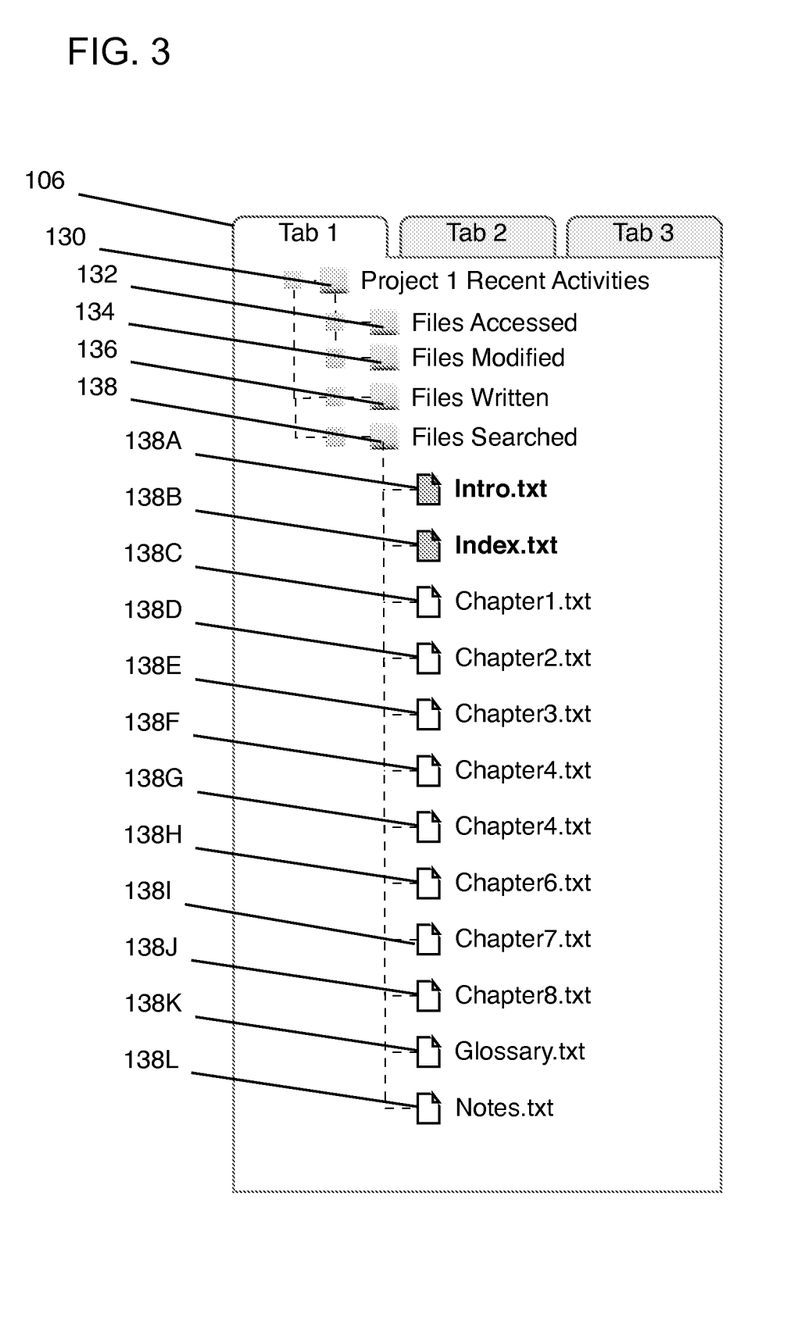
FIG. 3 shows a detailed view of a portion of the GUI of FIG. 1.

Referring now to FIG. 3, a detailed view of recent activities window 106 is shown. Here, the files searched folder 138 has been expanded to show its contents. As explained above, the files searched folder 138 includes links to files associated with the project (e.g., Project 1) that have been searched. In one embodiment, the files shown in the files searched folder 138 include only those files defined by the user as on his or her task list and searched by the user. In an alternative embodiment, the files searched folder 138 may further include files associated with the project but not on the user's task list that have been searched by the user. In yet another embodiment, the files searched folder 138 may also include files associated with the project that have been searched by other users, whether included on the user's task list or not.

In the case that the files in the files searched folder 138 contain either files not on the user's task list or files not searched by the user, it may be helpful to distinguish the files according to such categorizations. For example, as shown in FIG. 3, the Intro.txt 138A and Index.txt 138B files are shown in bold typeface and by a shaded icon. Such techniques may be used, for example, to identify these files as included on the user's task list while the remaining files 138C-L are not on the user's task list. Alternatively, such techniques may be used to identify these files as those searched by the user while the remaining files 138C-L as searched by another user or users. Any known or later-developed method, technique, or device for so distinguishing such files may be employed and are within the scope of the present invention.

It should be noted that while searching a file may be considered simply a specific method of reading (e.g., accessing) the file, a distinction is made between the two as used herein. Specifically, searching includes some form of input from a user (e.g., a search string), while reading (e.g., accessing) a file, involves merely viewing the file's contents.

Files 138A-L within the files searched folder 138 may be organized in any number of ways, as will be recognized by one skilled in the art (e.g., alphabetically, by file size, etc.). In a preferred embodiment, files are organized according to the recency in which each was searched. In another preferred embodiment, files are organized according to the frequency with which each has been searched.

Figure 4:
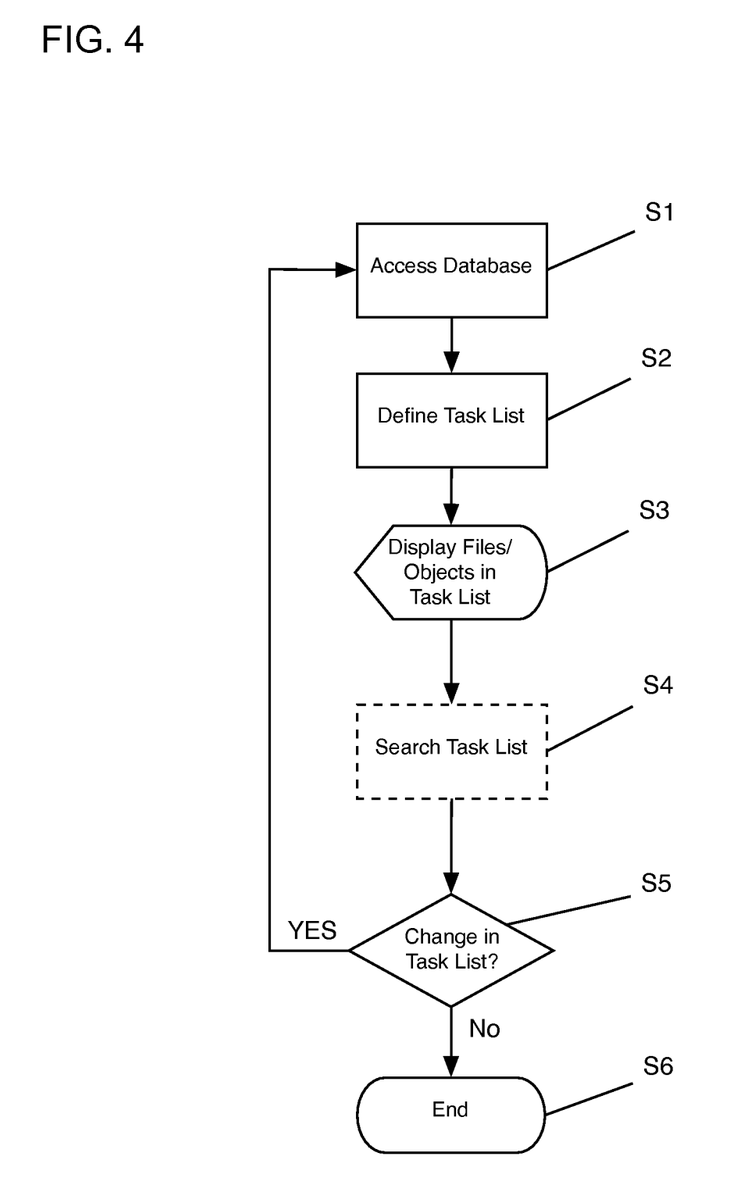
FIG. 4 shows a flow diagram of an illustrative method according to the invention.

FIG. 4 shows a flow diagram of an illustrative method according to the invention. At step S1, a user accesses a database containing files or other objects associated with a project on which the user will work. At step S2, the user defines his or her task list by selecting from the database accessed at step S1 one or more files on which the user will work. At step S3, the files or other objects selected at step S2 are displayed to the user as his or her task list.

At optional step S4, the user may choose to search within his or her task list for files or other objects. As noted above, the ability to search within only those files on the user's task list saves a great deal of time, effort, and computational resources, particularly when the user's task list contains a small proportion of the files or other objects within the broader database.

At step S5, it is determined whether the user's task list has changed, e.g., whether a file or other object should be added to or removed from the user's task list defined at step S2. If so (i.e., YES at step S5), steps S1 through S5 may be iteratively looped. If not (i.e., NO at step S5), the flow may be ended at step S6.

Figure 5:
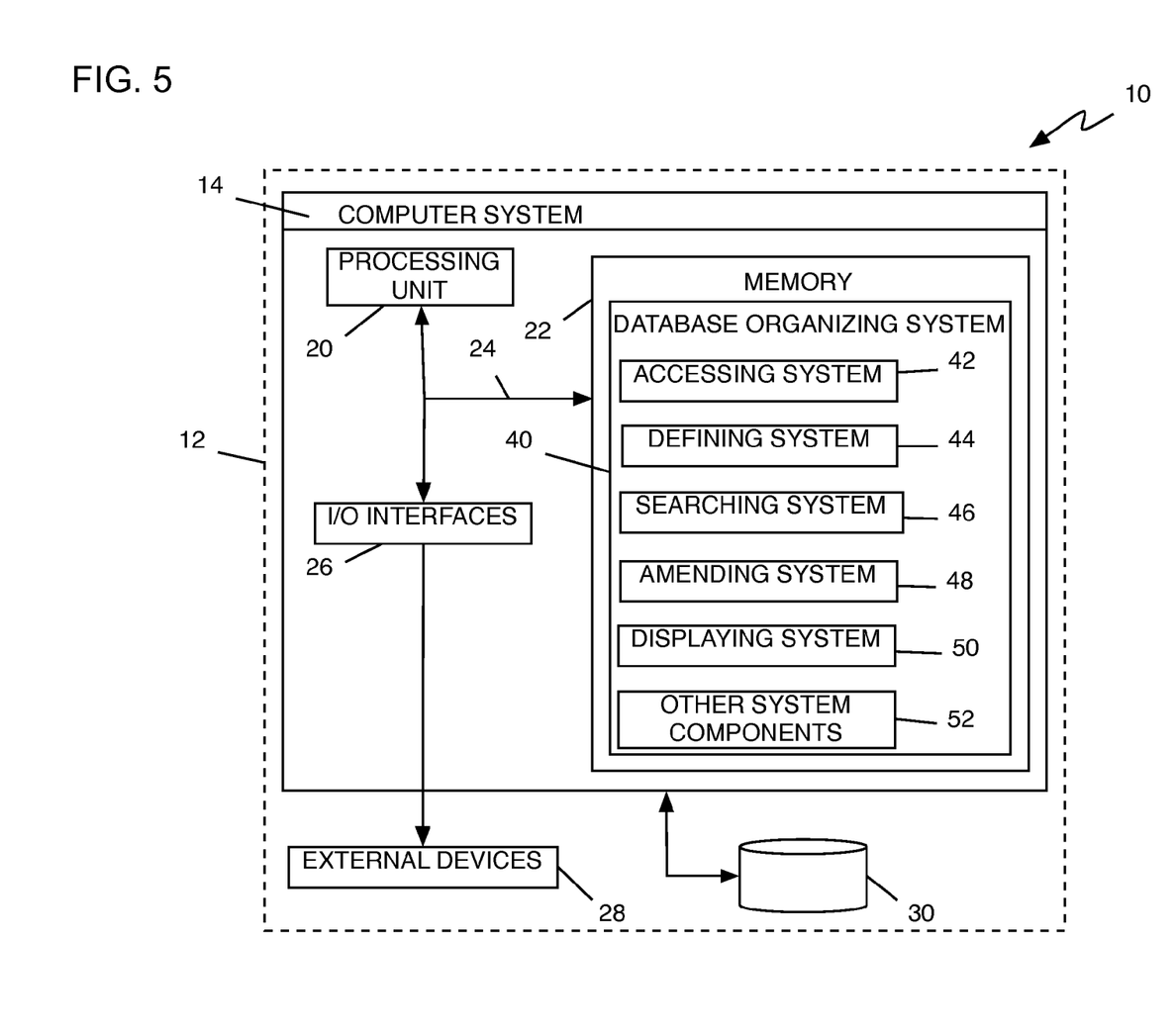
FIG. 5 shows a block diagram of an illustrative system according to the invention.

FIG. 5 shows an illustrative system 10 for organizing a database containing a plurality of objects based on a task list of a user. To this extent, system 10 includes a computer infrastructure 12 that can perform the various process steps described herein for organizing a database containing a plurality of objects based on a task list of a user. In particular, computer infrastructure 12 is shown including a computer system 14 that comprises a database organizing system 40, which enables computer system 14 to organize a database containing a plurality of objects based on a task list of a user by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as database organizing system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and database organizing system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, database organizing system 40 enables computer system 14 to organize a database containing a plurality of objects based on a task list of a user. To this extent, database organizing system 40 is shown including an accessing system 42, a defining system 44, a searching system 46, an amending system 48, and a displaying system 50. Operation of each of these systems is discussed above. Database organizing system 40 may further include other system components 52 to provide additional or improved functionality to database organizing system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for organizing a database containing a plurality of objects based on a task list of a user, it is understood that the invention further provides various alternative embodiments. For example, in one embodiment, the invention provides a computer-readable medium that includes computer program code to enable a computer infrastructure to organize a database containing a plurality of objects based on a task list of a user. To this extent, the computer-readable medium includes program code, such as database organizing system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to organize a database containing a plurality of objects based on a task list of a user, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for organizing a database containing a plurality of objects based on a task list of a user. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for organizing a plurality of objects in a database, the method comprising:
   accessing a database containing the plurality of objects;
   defining objects within the plurality of objects as included in a task list of a user;
   displaying in a single view on a graphical user interface (GUI),
   a file tree window displaying the defined objects, wherein the file tree window displaying is a link to the defined objects in the database, wherein the defined objects in the database remain available to at least one other user, and
   an activities window displaying a plurality of categories representing, and limited to, the user's activity(s) with respect to the defined objects, wherein the plurality of categories include files accessed, files modified, files written, and files searched;
   providing the ability to determine at least one of the following:
   a time at which each defined object was last accessed by the user;

a time at which each defined object was last modified by the user;
a time at which each defined object was last searched by the user;
the number of times the defined objects have been accessed;
the number of times the defined objects have been modified;
the number of times the defined objects have been searched;
a time at which each of the plurality of objects was last accessed;
a time at which each of the plurality of objects was last modified;
a time at which each of the plurality of objects was last searched;
the number of times each of the plurality of objects has been accessed;
the number of times each of the plurality of objects has been modified; or
the number of times each of the plurality of objects has been searched;
searching the defined objects of the task list of the user; and
determining whether another object should be added to the task list of the user.

2. The method of claim 1, further comprising:
amending a list of defined objects by at least one of the following:
  defining at least one additional object as included in the task list of the user; and
  defining at least one object as not included in the task list of the user.

3. The method of claim 1, further comprising:
modifying the display based on at least one determined value.

4. The method of claim 3, further comprising:
searching the modified display.

5. The method of claim 1, wherein at least one defined object is included in an additional task list of the user.

6. The method of claim 1, wherein at least one defined object is included in a task list of an additional user.

7. A system for organizing a plurality of objects in a database, the system comprising:
a computer hardware device including:
  a system for accessing a database containing the plurality of objects;
  a system for defining objects within the plurality of objects as included in a task list of a user;
  a system for displaying in a single view on a graphical user interface (GUI),
    a file tree window displaying the defined objects, wherein the file tree window displaying is a link to the defined objects in the database, wherein the defined objects in the database remain available to at least one other user, and
    an activities window displaying a plurality of categories representing, and limited to, the user's activity(s) with respect to the defined objects, wherein the plurality of categories include files accessed, files modified, files written, and files searched;
  a system for providing the ability to determine at least one of the following:
    a time at which each defined object was last accessed by the user;
    a time at which each defined object was last modified by the user;
    a time at which each defined object was last searched by the user;
    the number of times the defined objects have been accessed;
    the number of times the defined objects have been modified;
    the number of times the defined objects have been searched;
    a time at which each of the plurality of objects was last accessed;
    a time at which each of the plurality of objects was last modified;
    a time at which each of the plurality of objects was last searched;
    the number of times each of the plurality of objects has been accessed;
    the number of times each of the plurality of objects has been modified; or
    the number of times each of the plurality of objects has been searched;
searching the defined objects of the task list of the user; and
determining whether another object should be added to the task list of the user.

8. The system of claim 7, further comprising:
a system for amending a list of defined objects by at least one of the following:
  defining at least one additional object as included in the task list of the user; and
  defining at least one object as not included in the task list of the user.

9. The system of claim 7, further comprising:
a system for modifying the display based on at least one determined value.

10. The system of claim 9, further comprising:
a system for searching the modified display.

11. The system of claim 7, wherein at least one defined object is included in an additional task list of the user.

12. The system of claim 7, wherein at least one defined object is included in a task list of an additional user.

13. A program product stored on a computer-readable storage medium, which when executed, organizes a plurality of objects in a database, the program product comprising program code for:
accessing a database containing the plurality of objects;
defining objects within the plurality of objects as included in a task list of a user;
displaying in a single view on a graphical user interface (GUI),
  a file tree window displaying the defined objects, wherein the file tree window displaying is a link to the defined objects in the database, wherein the defined objects in the database remain available to at least one other user, and
  an activities window displaying a plurality of categories representing, and limited to, the user's activity(s) with respect to the defined objects, wherein the plurality of categories include files accessed, files modified, files written, and files searched;
providing the ability to determine at least one of the following:
  a time at which each defined object was last accessed by the user;
  a time at which each defined object was last modified by the user;
  a time at which each defined object was last searched by the user;

the number of times the defined objects have been accessed;

the number of times the defined objects have been modified;

the number of times the defined objects have been searched;

a time at which each of the plurality of objects was last accessed;

a time at which each of the plurality of objects was last modified;

a time at which each of the plurality of objects was last searched;

the number of times each of the plurality of objects has been accessed;

the number of times each of the plurality of objects has been modified; or the number of times each of the plurality of objects has been searched;

searching the defined objects of the task list of the user; and determining whether another object should be added to the task list of the user.

14. The program product of claim 13, further comprising:

program code for amending a list of defined objects by at least one of the following:

defining at least one additional object as included in the task list of the user; and defining at least one object as not included in the task list of the user.

15. The program product of claim 13, further comprising: program code for modifying the display based on at least one determined value.

16. The program product of claim 13, wherein at least one defined object is included in at least one of the following: an additional task list of the user and a task list of an additional user.

17. A method for deploying an application for organizing a plurality of objects in a database, comprising:

providing a computer infrastructure being operable to:

access a database containing the plurality of objects;

define objects the plurality of objects as included in a task list of a user;

display in a single view on a graphical user interface (GUI), a file tree window disrlayinq the defined obiects, wherein the file tree window displaying is a link to the defined objects in the database, wherein the defined objects in the database remain available to at least one other user, and an activities window displaying a plurality of categories representing, and limited to, the user's activity(s) with respect to the defined objects, wherein the plurality of categories include files accessed, files modified, files written, and files searched;

provide the ability to determine at least one of the following: a time at which each defined object was last accessed by the user; a time at which each defined object was last modified by the user; a time at which each defined object was last searched by the user; the number of times the defined objects have been accessed; the number of times the defined objects have been modified; the number of times the defined objects have been searched; a time at which each of the plurality of objects was last accessed; a time at which each of the plurality of objects was last modified; a time at which each of the plurality of objects was last searched; the number of times each of the plurality of objects has been accessed; the number of times each of the plurality of objects has been modified; or the number of times each of the plurality of objects has been searched;

search the defined objects of the task list of the user; and determine whether another object should be added to the task list of the user.

* * * * *